United States Patent [19]

Poff

[11] 4,216,853

[45] Aug. 12, 1980

[54] GRAIN RETARDER

[75] Inventor: James L. Poff, Coatesville, Ind.

[73] Assignee: Bryant-Poff, Inc., Coatesville, Ind.

[21] Appl. No.: 6,652

[22] Filed: Jan. 26, 1979

[51] Int. Cl.² ............................................ B65G 11/20
[52] U.S. Cl. ...................................................... 193/32
[58] Field of Search ..................................... 193/23, 32

[56] References Cited

U.S. PATENT DOCUMENTS

| | | | |
|---|---|---|---|
| 2,634,842 | 4/1953 | Caylor | 193/32 |
| 2,733,800 | 2/1956 | Fenske | 193/27 |

*Primary Examiner*—Robert B. Reeves

*Assistant Examiner*—Gene A. Church
*Attorney, Agent, or Firm*—Barnes, Kisselle, Raisch & Choate

[57] ABSTRACT

The grain retarder comprises a vertically extending tubular member of generally rectangular cross section having two sets of upwardly opening buckets mounted on a pair of opposite side walls of the tubular member. The buckets of one set are staggered vertically relative to the buckets of the other set. The bottom walls of the buckets are curved and provided with openings at the lowermost portions thereof to enable the buckets to empty themselves of grain when the flow to the upper end of the tubular member is terminated.

4 Claims, 3 Drawing Figures

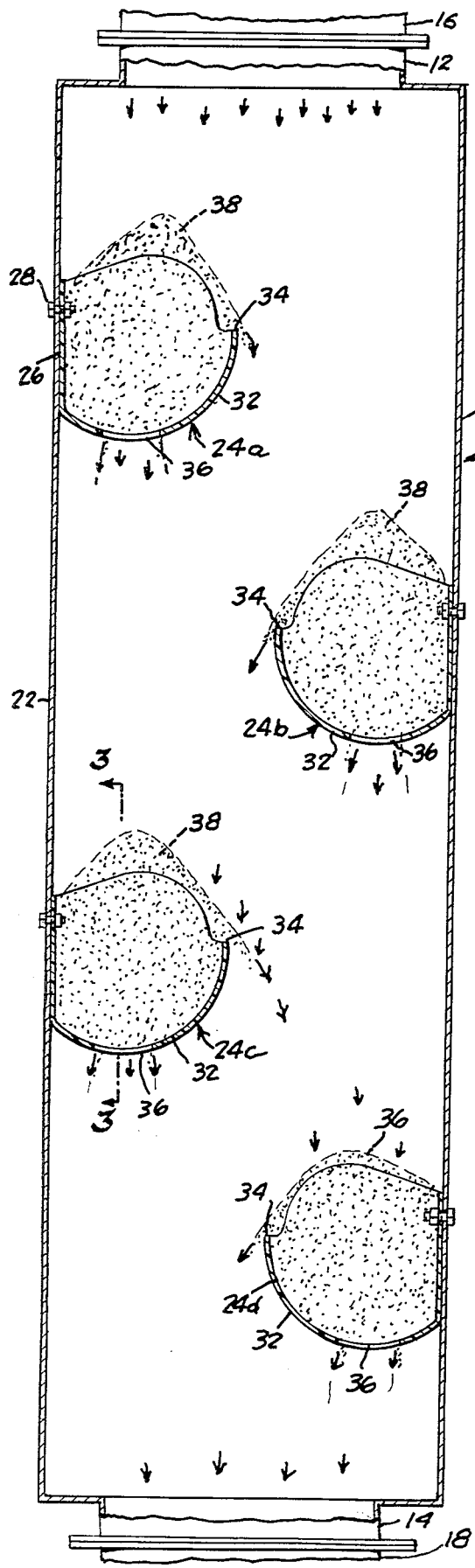
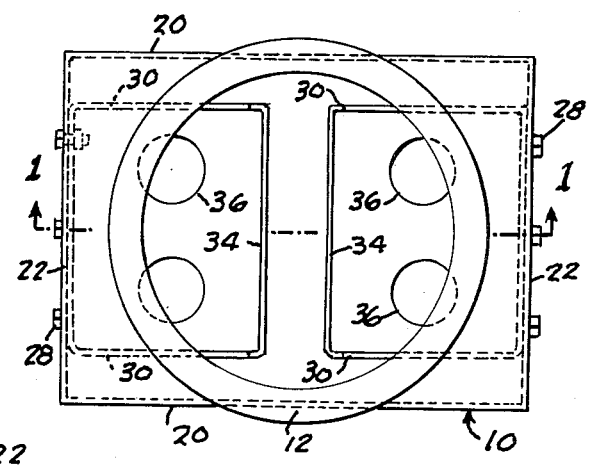
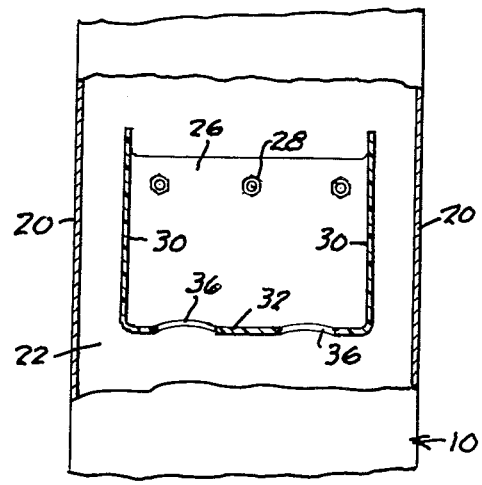
Fig. 1
Fig. 2
Fig. 3

GRAIN RETARDER

This invention relates to a gravity grain retarder.

In some types of grain handling apparatus, such as bucket elevators and the like, a retarder is sometimes used to reduce the velocity at which the grain falls through the apparatus. When grain falls into a bin, truck or other receptacle, it cracks and breaks if the height of free fall is excessive. Experience has shown that about a 40 foot vertical drop appears to be a critical height. Excessive cracking or breaking of the grain occurs when the free fall is about 40 feet or more. Cracked or broken grain increases the expense of cleaning the grain and has a substantially lower market value.

The present invention has for its object the provision of a unique grain retarder which is highly effective to prevent cracking and breaking of grain and which is self-cleaning and of relatively simple and economical construction.

Another object of this invention is to provide an effective grain retarder which does not diminish the flow capacity of the grain handling apparatus with which it is used.

Other objects, features and advantages of the present invention will become apparent from the following description and accompanying drawing, in which:

FIG. 1 is a vertical sectional view of a grain retarder according to the present invention taken generally along the line 1—1 in FIG. 2;

FIG. 2 is a top plan view of the retarder; and

FIG. 3 is a fragmentary sectional view taken along the line 3—3 in FIG. 1.

The grain retarder of the present invention comprises a tubular chute 10 having a flanged circular inlet 12 at its upper end and a flanged circular outlet 14 at its lower end. The flanged inlet 12 is adapted to be connected to the lower end of a vertically extending chute 16 which may form, for example, the discharge chute of a grain distributor or a bucket elevator. The flanged outlet 14 is adapted to be connected to a correspondingly flanged outlet nozzle 18 or the like. Retarder chute 10 is preferably rectangular in horizontal cross section, having two side walls 20 and two end walls 22. Two sets of buckets 24 are mounted in opposed relation on the two end walls 22. As shown in FIG. 1, two buckets 24 are preferably provided in each set and the buckets in one set are staggered vertically relative to the buckets in the other set. The uppermost bucket is designated 24a and the lowermost bucket is designated 24d. Bucket 24b is spaced medially between buckets 24a and 24c and bucket bucket 24c is spaced medially between buckets 24b and 24d. Each bucket is provided with a flat outer side wall 26 by means of which the bucket is mounted on the end wall 22 of chute 10 as by screws 28. Each of the buckets 24 is also formed with vertical side walls 30 and a curved bottom wall 32. The bottom wall 32 of each bucket curves upwardly at the inner side of the bucket and terminates in an upper edge 34. In the arrangement illustrated the side walls 30 of each bucket extend above a major portion of the edge 34 of the bucket. As shown in FIG. 2, the upper open end of each bucket is of generally rectangular shape and defined by the upper edges of the outer walls 26, the upper edges of side walls 30 and the edge 34. The lowermost portion of each bottom wall 32 is formed with a pair of relatively large openings 36. The combined area of the openings 36 in the bottom wall of each bucket is substantially less than the area of the upper open end of the bucket.

The preferable cross sectional size and position relationship between the buckets 24 and the chute 10 is shown in FIG. 2. The open ends of the buckets can be dimensioned somewhat larger than shown in FIG. 2, but preferably should not be dimensioned substantially smaller. In any event, the combined area of the open end of two opposed buckets (for example, bucket 24a and bucket 24b) should comprise the major portion of, but substantially less than the total of, the horizontal cross sectional area of the chute 10 and should be preferably larger than the area of inlet 12. In addition, it is desirable that the edges 34 of opposed buckets are spaced apart and that the side walls 30 of the buckets are spaced from the side walls 20 of the retarder chute. This size and positional relationship between the buckets and the chutes is desirable to insure that all of the grain flowing downwardly through inlet 12 will be retarded and at the same time the retarder will not become choked with grain so as to substantially diminish the flow capacity of the apparatus.

In typical installations chute 10 has a cross section of $11 \times 14\frac{1}{2}$ inches and a length of 4 feet, 3 inches. Each of the buckets 24 is $6\frac{1}{2} \times 8$ inches in cross section and about 6 inches deep. The edges 34 of opposed buckets are spaced apart about $1\frac{1}{2}$ inches and the side walls 30 of the buckets are spaced from the side walls 20 of chute 10 about $1\frac{1}{2}$ inches. The holes 36 in the bottom walls of the buckets are 2 inches in diameter. The buckets on each side of the chute are spaced apart vertically on 30 inch centers. The inlets 12 vary in size between 6 and 10 inches in diameter depending upon the diameter of the discharge chute 16 of the particular grain handling apparatus on which the retarder is used. Since the flow area of the retarder, that is, the cross sectional area of chute 10 not blocked by a pair of opposed buckets 24, is only slightly less than the area of even a 12 inch inlet, it follows that the flow capacity of the system will not be diminished by employing a retarder constructed and designed as described. In a typical retarder having the dimensions set forth above the area at any horizontal section obstructed by a bucket is less than one-half the cross sectional area of the tubular member and the vertical distance between vertically adjacent buckets is not less than the distance between an inner edge 34 of a bucket and the opposite end wall 22 of chute 10. This relationship provides ample grain flow area to prevent clogging of the retarder. One or more of the retarders are employed in vertically spaced relation depending upon the total vertical drop of the grain. The retarders should be spaced apart vertically on the average of between 25 and 30 feet in order to substantially eliminate the cracking and breaking of grain.

In operation a relatively large amount of grain is directed downwardly through the inlet 12 from the vertically extending chute 16. Initially at least most of this grain is received within the buckets 24a, 24b and these buckets fill with grain. However, simultaneously therewith grain is discharged from buckets 24a, 24b through the openings 36 into buckets 24c, 24d, respectively, thus tending to fill these lower buckets with grain as well. However, under normal conditions of flow for which the unit is designed all of the buckets will fill with grain at a rate faster than discharged therefrom through the bottom openings 36. Thus, the grain will build up in the buckets to the level indicated by broken lines 38. Accordingly, in addition to the grain gravitating downwardly through openings 36, grain from the bucket 24a will cascade downwardly over the edge 34 onto the grain accumulating in bucket 24b, grain from bucket 24b will cascade downwardly onto the grain accumulating in bucket 24c, and grain in bucket 24c will cascade downwardly onto the grain accumulating in bucket 24d. The grain will also cascade over the upper edges of the side walls 30 of the buckets. This is the reason why it is not necessary that the open upper ends of the buckets have a combined area equal to the horizontal cross sectional area of chute 10 in order to retard all the grain. The downwardly and laterally cascading grain will interfere with the grain which would normally tend to fall vertically between the edges 34 and between the side walls 30 of the buckets and the side walls 20 of the chute 10. Thus, the downward velocity of all the grain is substantially reduced, but the flow capacity of the system is not diminished as would be the case if the buckets completely enclosed the cross section of the chute.

I claim:

1. A grain retarder adapted to form a portion of a vertically downwardly extending grain discharge chute comprising a vertically extending tubular member of uniform rectangular cross section having an inlet at its upper end and an outlet at its lower end, two sets of horizontally opposed buckets of rectangular cross section mounted within the tubular member on opposite end walls thereof, the buckets in one set being staggered vertically relative to the buckets in the other set, each of said buckets having an open upper end and a downwardly sloping bottom wall, said bottom wall having an aperture at the lowermost portion thereof substantially smaller than the open upper end of the bucket through which grain is adapted to gravitate and discharge as the bucket fills with grain, the adjacent edges of the opposed buckets being spaced apart laterally so as to form an unobstructed straight vertical passageway between the two sets of buckets which extends downwardly through the central portion of the tubular member, the opposite side walls of each bucket being spaced laterally from the adjacent side walls of the tubular member so as to form two unobstructed vertical passageways between each set of buckets and the adjacent side walls of the tubular member, the buckets being spaced apart vertically such that the vertical distance between vertically adjacent buckets is not substantially less than the lateral distance between the inner edge of a bucket and the end wall of the tubular member opposite thereto, the major portion of the cross sectional area of the tubular member when viewed in horizontal section comprising the open upper ends of said buckets, whereby, when the grain is directed downwardly through said inlet, the major portion thereof is caught by the uppermost buckets in each set and then gravitates successively downwardly from one bucket to the next through the apertured bottom walls thereof and, when the amount of grain directed through the inlet is sufficiently large in relation to the size of the apertures, the grain also overflows the upper edges of the buckets and cascades downwardly at an angle to the vertical axis of the tubular member successively between the vertically adjacent buckets of the opposed sets and between each set of buckets and the adjacent side walls of the tubular member, the path of travel of said angularly downwardly cascading grain intersecting the path of travel of the grain tending to flow downwardly in said passageways parallel to the vertical axis of the tubular member, whereby the downward velocity of all the grain is substantially reduced relative to its free fall velocity without substantially diminishing the grain flow capacity of the tubular member.

2. The grain retarder as called for in claim 1 wherein the horizontal spacing between the inner opposed edges of the two sets of buckets is substantially less than the horizontal dimension of each bucket in a direction perpendicular to said opposed edges.

3. The grain retarder as called for in claim 1 wherein said buckets are at least four in number and include two in each opposed set of buckets.

4. The grain retarder as called for in claim 3 wherein the buckets are staggered generally uniformly, one bucket in each set being positioned medially between the two buckets in the other set.

* * * * *